(12) United States Patent
Kawano et al.

(10) Patent No.: US 11,217,266 B2
(45) Date of Patent: Jan. 4, 2022

(54) INFORMATION PROCESSING DEVICE AND INFORMATION PROCESSING METHOD

(71) Applicant: SONY CORPORATION, Tokyo (JP)

(72) Inventors: Shinichi Kawano, Tokyo (JP); Yuhei Taki, Kanagawa (JP); Yusuke Nakagawa, Kanagawa (JP); Ayumi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 206 days.

(21) Appl. No.: 16/089,174

(22) PCT Filed: Apr. 10, 2017

(86) PCT No.: PCT/JP2017/014717
§ 371 (c)(1),
(2) Date: Sep. 27, 2018

(87) PCT Pub. No.: WO2017/221516
PCT Pub. Date: Dec. 28, 2017

(65) Prior Publication Data
US 2020/0302950 A1    Sep. 24, 2020

(30) Foreign Application Priority Data

Jun. 21, 2016  (JP) .............................. JP2016-122437

(51) Int. Cl.
G10L 25/51   (2013.01)
G10L 15/04   (2013.01)
G10L 15/26   (2006.01)

(52) U.S. Cl.
CPC .............. *G10L 25/51* (2013.01); *G10L 15/04* (2013.01); *G10L 15/26* (2013.01)

(58) Field of Classification Search
None
See application file for complete search history.

(56) References Cited

U.S. PATENT DOCUMENTS 5,864,805 A * 1/1999 Chen ....................... G10L 15/22
704/235
8,612,213 B1 * 12/2013 Zhai ...................... G06F 40/232
704/9

(Continued)

FOREIGN PATENT DOCUMENTS

JP    H03-148750 A    6/1991
JP    2003-316386 A   11/2003

(Continued)

*Primary Examiner* — Thuykhanh Le
(74) *Attorney, Agent, or Firm* — Paratus Law Group, PLLC

(57) ABSTRACT

There is provided an information processing device to achieve more flexible correction of a recognized sentence, the information processing device including: a comparison unit configured to compare first sound-related information obtained from collected first utterance information with second sound-related information obtained from collected second utterance information; and a setting unit configured to set a new delimiter position different from a result of speech-to-text conversion associated with the first utterance information on a basis of a comparison result obtained by the comparison unit. There is also provided an information processing device including: a reception unit configured to receive information regarding a new delimiter position different from a result of speech-to-text conversion associated with collected first utterance information; and an output control unit configured to control output of a new conversion result obtained by performing speech-to-text conversion on a basis of the new delimiter position.

18 Claims, 14 Drawing Sheets

| VARIATION IN DELIMITER POSITIONS | | | | CONFIDENCE LEVEL |
|---|---|---|---|---|
| | Siam fighting | a tag sentence | | 0.98 |
| S | I am writing | a tag sentence | | 0.95 |
| | Siam fighting | a tag | sentence | 0.5 |
| | Siam fighting | a | tag sentence | 0.2 |

(56) References Cited

U.S. PATENT DOCUMENTS

| | | | |
|---|---|---|---|
| 9,123,339 B1* | 9/2015 | Shaw | G10L 15/22 |
| 2003/0038735 A1* | 2/2003 | Blumberg | G06F 3/0237 |
| | | | 341/22 |
| 2003/0216912 A1* | 11/2003 | Chino | G10L 15/22 |
| | | | 704/231 |
| 2004/0054533 A1* | 3/2004 | Bellegarda | G10L 15/187 |
| | | | 704/254 |
| 2005/0119889 A1* | 6/2005 | Yamazaki | G10L 13/07 |
| | | | 704/259 |
| 2005/0283364 A1* | 12/2005 | Longe | G06K 9/00422 |
| | | | 704/257 |
| 2006/0004564 A1* | 1/2006 | Aronowitz | G06F 40/242 |
| | | | 704/10 |
| 2006/0173685 A1* | 8/2006 | Huang | G10L 15/06 |
| | | | 704/254 |
| 2007/0055530 A1* | 3/2007 | Onishi | G10L 17/04 |
| | | | 704/275 |
| 2007/0073540 A1* | 3/2007 | Hirakawa | G10L 15/22 |
| | | | 704/252 |
| 2008/0167860 A1* | 7/2008 | Goller | G06F 8/65 |
| | | | 704/201 |
| 2009/0029328 A1* | 1/2009 | Voegeli | G09B 17/003 |
| | | | 434/167 |
| 2009/0192800 A1* | 7/2009 | Brandt | 704/270.1 |
| 2010/0010815 A1* | 1/2010 | Bells | G10L 13/027 |
| | | | 704/260 |
| 2011/0010174 A1* | 1/2011 | Longe | G10L 15/24 |
| | | | 704/235 |
| 2013/0013313 A1* | 1/2013 | Shechtman | G10L 13/033 |
| | | | 704/260 |
| 2013/0204609 A1* | 8/2013 | Gandhi | G06F 40/20 |
| | | | 704/9 |
| 2013/0257732 A1* | 10/2013 | Duffield | G06F 3/04886 |
| | | | 345/168 |
| 2014/0278357 A1* | 9/2014 | Horton | G06F 40/56 |
| | | | 704/9 |
| 2015/0019218 A1* | 1/2015 | Yassa | G10L 25/87 |
| | | | 704/236 |
| 2015/0364140 A1* | 12/2015 | Thorn | G06F 3/013 |
| | | | 704/235 |
| 2015/0379996 A1* | 12/2015 | Kodaira | G10L 15/26 |
| | | | 704/235 |
| 2016/0026621 A1* | 1/2016 | Misra | G06F 40/30 |
| | | | 704/9 |
| 2016/0048500 A1* | 2/2016 | Hebert | G06F 40/295 |
| | | | 704/9 |
| 2016/0062458 A1* | 3/2016 | Kristensson | G06F 3/0236 |
| | | | 345/156 |
| 2016/0077734 A1* | 3/2016 | Buxton | G06F 3/0488 |
| | | | 715/773 |
| 2016/0110339 A1* | 4/2016 | Yamano | G10L 15/26 |
| | | | 704/9 |
| 2016/0148611 A1* | 5/2016 | Kim | G10L 15/083 |
| | | | 704/240 |
| 2016/0163316 A1* | 6/2016 | McLean | G06F 40/232 |
| | | | 704/235 |
| 2016/0217789 A1* | 7/2016 | Lee | G10L 15/32 |
| 2016/0253989 A1* | 9/2016 | Kuo | G10L 15/183 |
| | | | 704/257 |
| 2016/0284349 A1* | 9/2016 | Ravindran | G10L 15/20 |
| 2016/0357731 A1* | 12/2016 | Zorzin | G06F 40/30 |
| 2017/0032779 A1* | 2/2017 | Ahn | G10L 15/063 |
| 2017/0200458 A1* | 7/2017 | Kang | G10L 25/87 |
| 2017/0278424 A1* | 9/2017 | Tseng | G10L 25/72 |

FOREIGN PATENT DOCUMENTS

| | | |
|---|---|---|
| JP | 2007-093789 A | 4/2007 |
| JP | 2008-051895 A | 3/2008 |

* cited by examiner

FIG.5

| VARIATION IN DELIMITER POSITIONS | | | CONFIDENCE LEVEL |
|---|---|---|---|
| Siam fighting | a tag sentence | | 0.98 |
| S | I am writing | a tag sentence | 0.95 |
| Siam fighting | a tag | sentence | 0.5 |
| Siam fighting | a | tag sentence | 0.2 |

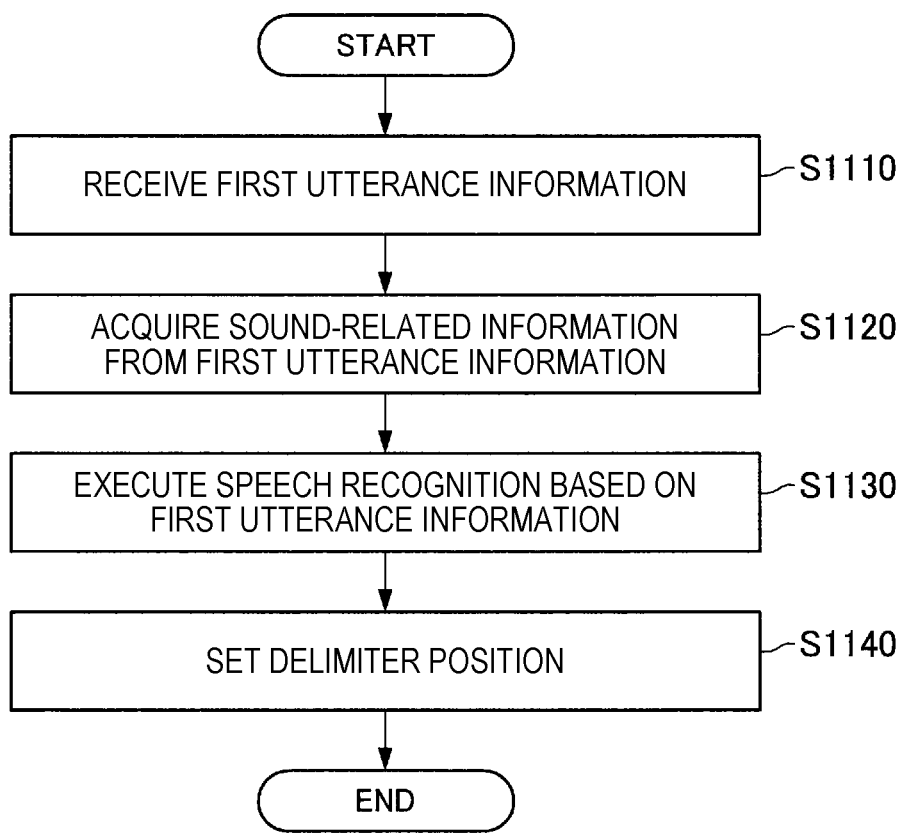

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2017/014717 (filed on Apr. 10, 2017) under 35 U.S.C. § 371, which claims priority to Japanese Patent Application No. 2016-122437 (filed on Jun. 21, 2016), which are all hereby incorporated by reference in their entirety.

TECHNICAL FIELD

The present disclosure relates to an information processing device and an information processing method.

BACKGROUND ART

Various devices are now being developed that recognize a user's utterance and execute processing corresponding to the recognized speech input. In addition, a technique for correcting an error, if any, in the recognized result on the basis of a re-input utterance is known. In one example, Patent Literature 1 discloses the speech recognition device that corrects the recognized result by selecting the most probable recognition candidate from recognition candidates for each predetermined segment in input speech.

CITATION LIST

Patent Literature

Patent Literature 1: JP 2007-093789A

DISCLOSURE OF INVENTION

Technical Problem

However, in the speech recognition device disclosed in Patent Literature 1, in the case where the predetermined segment is erroneously set, even if the user repeatedly utters a plurality of times, it may be difficult to obtain a recognition result intended by the user.

In view of this, the present disclosure provides an information processing device and an information processing method, capable of achieving more flexible correction of a recognized sentence.

Solution to Problem

According to the present disclosure, there is provided an information processing device including: a comparison unit configured to compare first sound-related information obtained from collected first utterance information with second sound-related information obtained from collected second utterance information; and a setting unit configured to set a new delimiter position different from a result of speech-to-text conversion associated with the first utterance information on a basis of a comparison result obtained by the comparison unit.

In addition, according to the present disclosure, there is provided an information processing device including: a reception unit configured to receive information regarding a new delimiter position different from a result of speech-to-text conversion associated with collected first utterance information; and an output control unit configured to control output of a new conversion result obtained by performing speech-to-text conversion on a basis of the new delimiter position. The new delimiter position is set on a basis of a result obtained by comparing first sound-related information obtained from the collected first utterance information with second sound-related information obtained from collected second utterance information.

In addition, according to the present disclosure, there is provided an information processing method including: comparing, by a processor, first sound-related information obtained from collected first utterance information with second sound-related information obtained from collected second utterance information; and setting a new delimiter position different from a result of speech-to-text conversion associated with the first utterance information on a basis of a result obtained by comparing the first sound-related information with the second sound-related information.

In addition, according to the present disclosure, there is provided an information processing method including: receiving, by a processor, information regarding a new delimiter position different from a result of speech-to-text conversion associated with collected first utterance information; and controlling output of a new conversion result obtained by performing speech-to-text conversion on a basis of the new delimiter position. The new delimiter position is set on a basis of a result obtained by comparing first sound-related information obtained from the collected first utterance information with second sound-related information obtained from collected second utterance information.

Advantageous Effects of Invention

According to the present disclosure as described above, it is possible to correct the recognized sentence more flexibly.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of confidence of the delimiter position according to the present embodiment.

FIG. 7 is a flowchart illustrating a processing procedure by an information processing server on first utterance information according to the present embodiment.

MODE(S) FOR CARRYING OUT THE INVENTION

Figure 1:
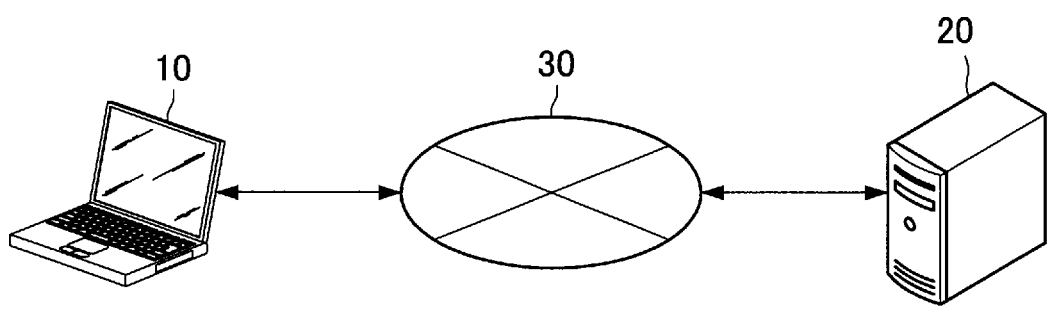
FIG. 1 is a diagram illustrating an exemplary configuration of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, in a case where there is no need in particular to distinguish structural elements that have substantially the same function and structure, the same reference sign alone is attached.

Moreover, the description will be given in the following order.
1. Embodiment
1.1. Overview of embodiment according to present disclosure
1.2. Exemplary configuration of system
1.3. Example of functional configuration of information processing terminal 10
1.4. Example of functional configuration of information processing server 20
1.5. Specific example of speech-to-text conversion based on new delimiter position
1.6. Operation procedure in information processing server 20
2. Exemplary hardware configuration
3. Concluding remarks

1. Embodiment

1.1. Overview of Embodiment According to Present Disclosure

In various game consoles, smartphone applications, autonomous robots, or the like, speech recognition technologies are now being used that recognize a user's utterance and perform processing based on the utterance. Devices that employ the speech recognition technology are also capable of inputting, as text, speech uttered by the user, in one example, in place of an input device such as keyboards. The use of the device as described above makes is possible for the user to reduce significantly the burden caused by inputting text using keyboards or the like.

Meanwhile, in a case where an output result that is unintended by the user is obtained in inputting text using the speech recognition, it is necessary to provide a means for correcting the output result. In addition, in a case where speech-to-text conversion of the output result is performed at a delimiter position different from that is intended by the user, a device without the above-described means for correcting delimiter positions will be difficult to obtain the output result intended by the user even in a case where the user utters repeatedly.

The information processing device according to the present disclosure is conceived focusing on the above-described points, and makes it possible to correct a delimiter position at which speech-to-text conversion is performed on the basis of input utterance information. The following description is given of the features of the information processing device according to the present disclosure and the effects resulting from the features.

1.2. Exemplary Configuration of System

An exemplary configuration of a system according to the present embodiment is now described. FIG. 1 is a diagram illustrating an exemplary configuration of a system according to the present embodiment. Referring to FIG. 1, the information processing system according to the present embodiment includes an information processing terminal 10 and an information processing server 20. In addition, the information processing terminal 10 and the information processing server 20 are connected via a network 30 so that they can communicate with each other.
(Information Processing Terminal 10)

The information processing terminal 10 according to the present embodiment is an information processing device having a function of collecting information on the user's utterance. In addition, the information processing terminal 10 has a function of presenting a result obtained by performing the speech-to-text conversion associated with the utterance information to the user.

The information processing terminal 10 according to the present embodiment thus is capable of, in one example, transmitting the collected utterance information to the information processing server 20 and receiving the result obtained by performing the speech-to-text conversion based on the utterance information.

Moreover, the information processing terminal 10 can be implemented in various forms. In one example, the information processing terminal 10 is preferably mobile phones, smartphones, tablet computers, personal computers (PCs), game consoles, video players, or wearable devices.
(Information Processing Server 20)

The information processing server 20 according to the present embodiment is an information processing device having a function of performing the speech-to-text conversion based on the utterance information collected by the information processing terminal 10. In addition, the information processing server 20 according to the present embodiment has a function of changing a delimiter position at which the speech-to-text conversion is performed on the basis of re-input utterance information. In this event, the information processing server 20 according to the present embodiment sets preferably, in one example, a new delimiter position different from the result obtained by performing the speech-to-text conversion associated with the utterance information collected in advance. The above-described function of the information processing server 20 according to the present embodiment will be described later in detail.

(Network 30)

The network 30 has a function of connecting the information processing terminal 10 and the information processing server 20. The network 30 preferably includes public line networks such as the Internet, telephone line network, or satellite communication network, various local area networks (LANs) and wide area networks (WANs) including Ethernet (registered trademark), or the like. In addition, the network 30 preferably includes a leased line network such as Internet protocol-virtual private network (IP-VPN). In addition, the network 30 preferably includes a wireless communication network such as Wi-Fi (registered trademark) or Bluetooth (registered trademark).

The exemplary configuration of the system according to the present embodiment is described above. Moreover, although the above description with reference to FIG. 1 is intended to illustrate the case where the information processing terminal 10 and the information processing server 20 are implemented as independent information processing devices, the exemplary configuration of the system according to the present embodiment is not limited to such example. The information processing terminal 10 and the information processing server 20 according to the present embodiment can be implemented as one information processing device.

Meanwhile, each function of the information processing terminal 10 and the information processing server 20 can be implemented by a plurality of, for example, three of more information processing devices. The exemplary configuration of the system according to the present embodiment can be deformed flexibly depending on the amount of information to be handled, specifications of the system, operating conditions, or the like.

1.3. Example of Functional Configuration of Information Processing Terminal 10

Figure 2:
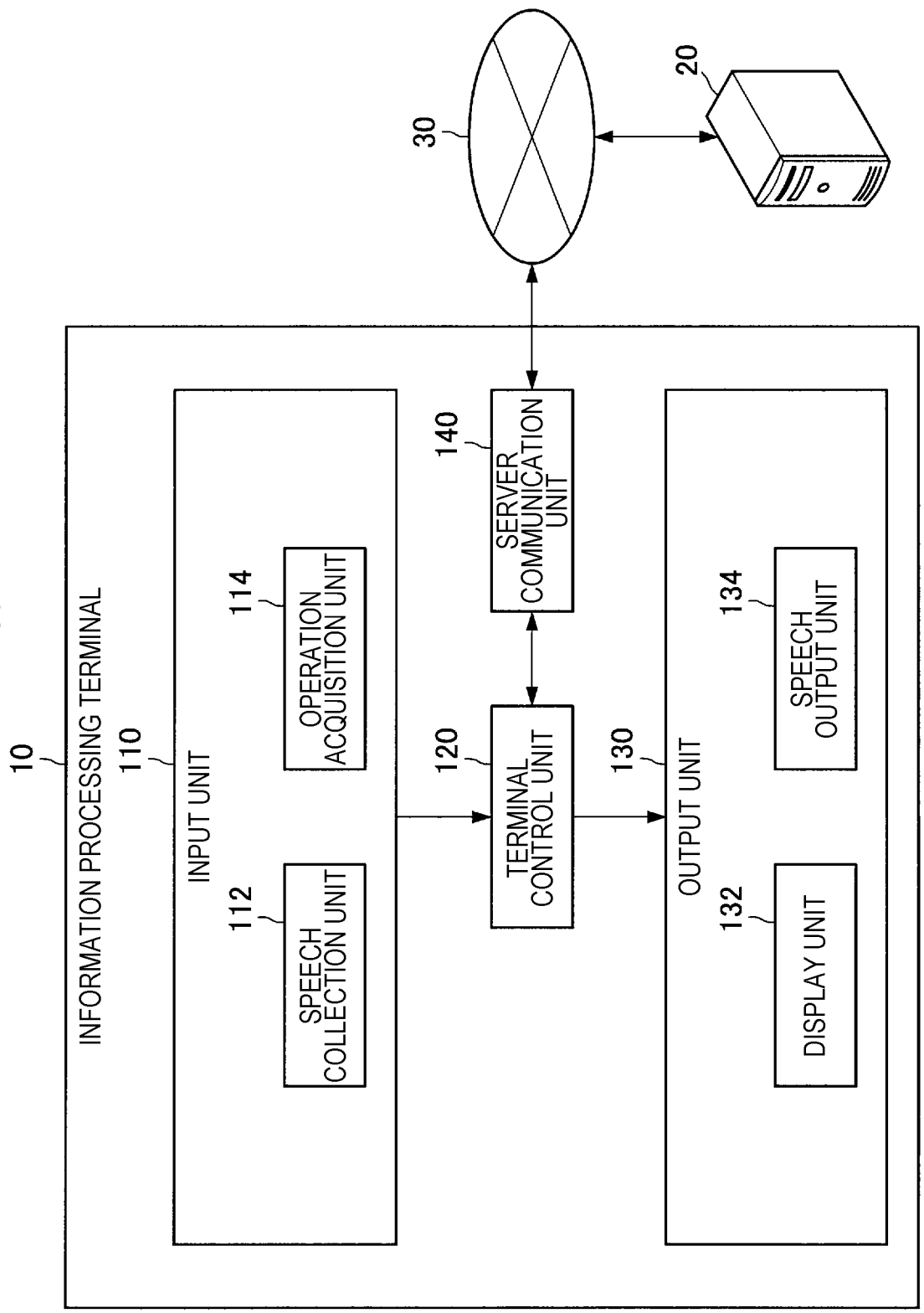
FIG. 2 is a functional block diagram of an information processing terminal according to the present embodiment.

An example of the functional configuration of the information processing terminal 10 according to the present embodiment is now described in detail. FIG. 2 is a functional block diagram of the information processing terminal 10 according to the present embodiment. Referring to FIG. 2, the information processing terminal 10 according to the present embodiment includes an input unit 110, a terminal control unit 120, an output unit 130, and a server communication unit 140. In addition, the input unit 110 according to the present embodiment includes a speech collection unit 112 and an operation acquisition unit 114. In addition, the output unit 130 according to the present embodiment includes a display unit 132 and a speech output unit 134.

The respective components described above are now described in detail focusing on the features of the component. Moreover, the functional configuration shown in FIG. 2 is merely illustrative, and the information processing terminal 10 according to the present embodiment can further include a functional configuration other than that illustrated in FIG. 2. The functional configuration of the information processing terminal 10 according to the present embodiment can be appropriately changed depending on the features of the device, operating conditions, or the like.

(Input Unit 110)

The input unit 110 has a function of detecting various types of input by the user. The input unit 110 thus preferably includes various sensors or devices for detecting a user's utterance or an input operation by the user. In particular, in the present embodiment, the input unit 110 can include the speech collection unit 112 and the operation acquisition unit 114.

((Speech Collection Unit 112))

The speech collection unit 112 has a function of collecting information on the user's utterance. The above-described utterance information can include ambient environmental sound or the like, in addition to the speech uttered by the user. The speech collection unit 112 can be configured as, in one example, a microphone that converts the user's speech or environmental sound into an electric signal.

Further, the speech collection unit 112 according to the present embodiment is capable of collecting first utterance information and second utterance information. Here, the first utterance information can be newly collected utterance information, and the second utterance information can be utterance information acquired after acquisition of the first utterance information. The second utterance information according to the present embodiment can be, in one example, utterance information collected within a predetermined time after the collection of the first utterance information.

((Operation Acquisition Unit 114))

The operation acquisition unit 114 has a function of detecting various input operations of the user on the information processing terminal 10. In one example, the operation acquisition unit 114 according to the present embodiment is capable of detecting an operation of deleting a result obtained from the speech-to-text conversion by the user. In this event, the operation acquisition unit 114 is capable of generating target information used to specify the first utterance information on the basis of the detected input operation. The target information according to the present embodiment will be described later in detail.

The operation acquisition unit 114 can be configured as, in one example, various buttons, a keyboard, a computer mouse, switches, or the like. In addition, the operation acquisition unit 114 is preferably configured as a touch panel, which is commonly usable as a display device.

(Terminal Control Unit 120)

The terminal control unit 120 has a function of controlling each processing executed by the information processing terminal 10. The terminal control unit 120 can control, in one example, various outputs from the output unit 130. The terminal control unit 120 according to the present embodiment is capable of controlling, in particular, the output of a conversion result obtained by performing the speech-to-text conversion based on the delimiter position that is set by the information processing server 20. In this event, the terminal control unit 120 can cause the output unit 130 to output the conversion result and the delimiter position in association with each other.

(Output Unit 130)

The output unit 130 has a function of outputting the result of the speech-to-text conversion associated with the utterance information under the control of the terminal control unit 120. The output unit 130 according to the present embodiment thus includes preferably various devices for outputting the conversion result. In particular, in the present embodiment, the output unit 130 preferably includes the display unit 132 and the speech output unit 134.

((Display Unit 134))

The display unit 132 has a function of performing the output together with visual information on the basis of the received response information. This function is preferably achieved by, in one example, cathode ray tube (CRT) display devices, liquid crystal display (LCD) devices, or organic light emitting diode (OLED) devices. In addition, the display unit 132 preferably has a function acting as an input unit that accepts user's operation. The function acting as the input unit can be achieved by, in one example, a touch panel.

((Speech Output Unit 134))

The speech output unit 134 has a function of converting an electric signal into sound and outputting it. Specifically, the speech output unit 134 has a function of presenting the speech based on speech information included in the received response information to the user. The speech output unit 134 preferably includes a loudspeaker, an amplifier, or the like having the above-described function.

(Server Communication Unit 140)

The server communication unit 140 has a function of communicating with the information processing server 20 via the network 30. The server communication unit 140 according to the present embodiment preferably transmits, in one example, the above-described first and second utterance information. In addition, the server communication unit 140 can receive information regarding a new delimiter position different from the result obtained by performing the speech-to-text conversion associated with the first utterance information or a new conversion result based on the new delimiter position.

Furthermore, the server communication unit 140 according to the present embodiment is capable of transmitting the target information used to specify the first utterance information and receiving the information regarding the new delimiter position that is set on the basis of the target information.

The example of the functional configuration of the information processing terminal 10 according to the present embodiment is described above in detail. As described above, the information processing terminal 10 according to the present embodiment is capable of receiving the information regarding the new delimiter position different from the result obtained by performing speech-to-text conversion associated with the first utterance information and controlling output of the conversion result obtained by performing the speech-to-text conversion based on the new delimiter position. The above-described function of the information processing terminal 10 according to the present embodiment makes it possible to present to the user the result obtained by performing speech-to-text conversion in which the delimiter position unintended by the user is corrected.

Moreover, the functional configuration described above is merely illustrative, and the functional configuration of the information processing terminal 10 according to the present embodiment is not limited to this example. The information processing terminal 10 according to the present embodiment preferably further has components for implementing various functions of the information processing server 20. In one example, the information processing terminal 10 can be configured to include some or all of a speech recognition unit 210, a comparison unit 220, a setting unit 230, a conversion unit 240, and a storage unit 250, which will be described later. The functional configuration of the information processing terminal 10 according to the present embodiment can be flexibly changed.

1.4. Example of Functional Configuration of Information Processing Server 20

Figure 3:
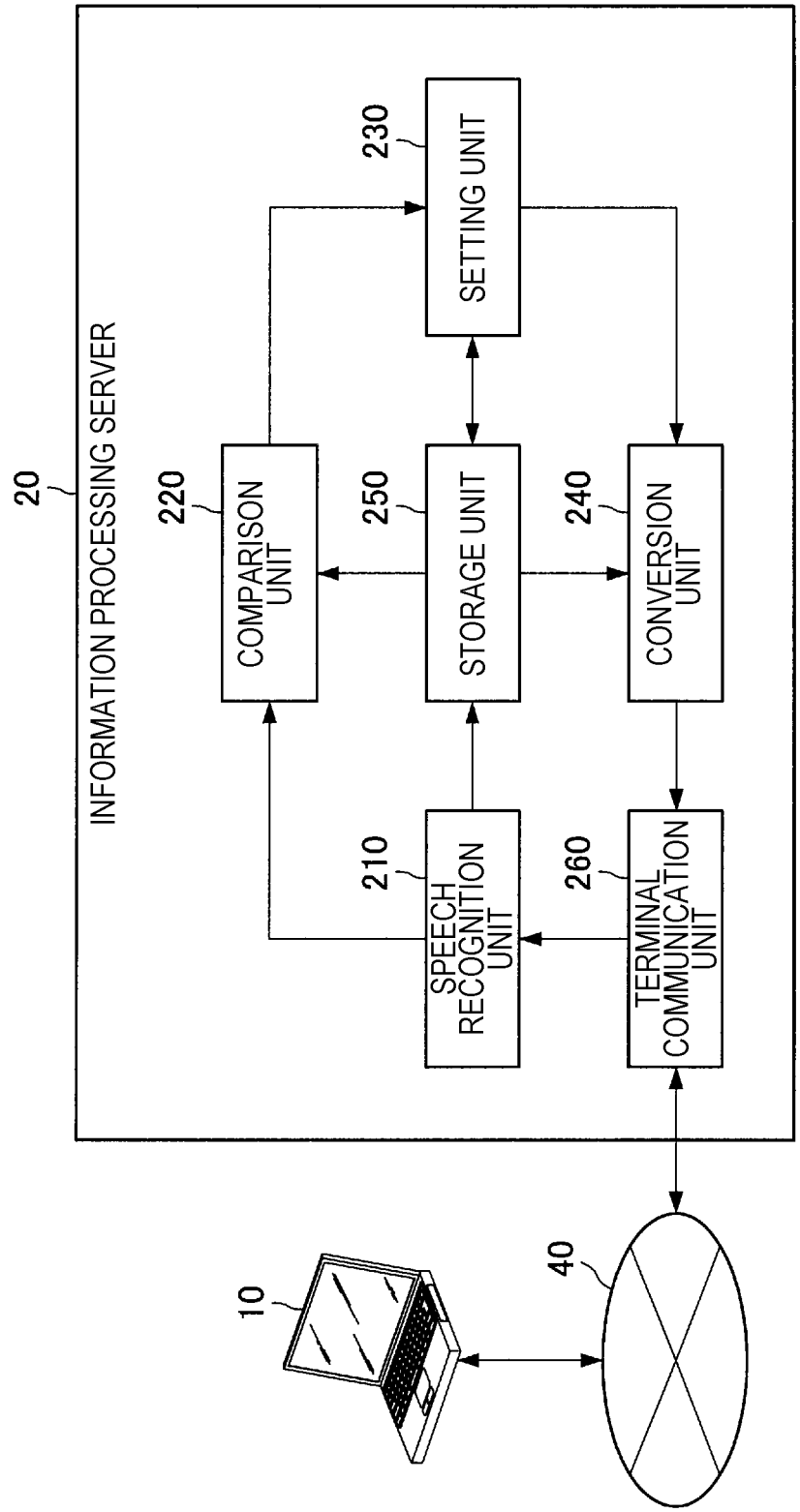
FIG. 3 is a functional block diagram of an information processing server according to the present embodiment.

An example of the functional configuration of the information processing server 20 according to the present embodiment is now described in detail. FIG. 3 is a functional block diagram of the information processing server 20 according to the present embodiment. Referring to FIG. 3, the information processing server 20 according to the present embodiment includes the speech recognition unit 210, the comparison unit 220, the setting unit 230, the conversion unit 240, the storage unit 250, and a terminal communication unit 260. The respective components described above are now described in detail focusing on the features of the component.

(Speech Recognition Unit 210)

The speech recognition unit 210 has a function of performing speech recognition based on the utterance information collected by the speech collection unit 112 of the information processing terminal 10. Specifically, the speech recognition unit 210 preferably performs speech recognition based on the received first utterance information or second uttered information. In addition, the speech recognition unit 210 is capable of causing sound-related information together with a result of the speech recognition based on the utterance information to be stored in the storage unit 250. Here, the above-mentioned sound-related information is preferably reading information in the extracted phoneme or speech recognition result. In addition, the speech recognition unit 210 preferably transmits the speech recognition result and the sound-related information to the comparison unit 220.

(Comparison Unit 220)

The comparison unit 220 has a function of comparing first sound-related information obtained from the collected first utterance information with second sound-related information obtained from the second utterance information. Specifically, the comparison unit 220 according to the present embodiment is capable of determining whether the first sound-related information and the second sound-related information are similar or identical. In this event, in one example, the comparison unit 220 preferably determines the similarity between the first sound-related information and the second sound-related information on the basis of the fact that the similarity exceeds a predetermined threshold value.

Further, the comparison unit 220 preferably compares the first sound-related information with the second sound-related information on the basis of the above-described target information generated by the operation acquisition unit 114. In other words, the comparison unit 220 according to the present embodiment is capable of specifying the first utterance information to be used for comparison with the second utterance information on the basis of the target information. In addition, the comparison unit 220 causes the storage unit 250 to store the result obtained by comparing the first utterance information with the second utterance information. In addition, the comparison unit 220 preferably transmits the comparison result to the setting unit 230.

(Setting Unit 230)

The setting unit 230 has a function of setting a delimiter position with respect to the speech recognition result obtained by the speech recognition unit 210. Here, the delimiter position according to the present embodiment is preferably set in units of a phrase, a character string such as words, a phoneme string such as accentual phrases, a phoneme, a syllable, or the like. In particular, the setting unit 230 according to the present embodiment is capable of setting a new delimiter position different from the result obtained by performing speech-to-text conversion associated with the first utterance information on the basis of the comparison result obtained by the comparison unit 220. In one example, the setting unit 230 is capable of performing the above-described processing on the basis of the fact that the comparison result indicates similarity or coincidence. The above-described function of the setting unit 230 will be described later in detail. In addition, the setting unit 230 is capable of causing the storage unit 250 to store information regarding the set delimiter position. The setting unit 230 preferably transmits the information regarding the delimiter position to the conversion unit 240.

(Conversion Unit 240)

The conversion unit 240 has a function of performing the speech-to-text conversion based on the new delimiter position that is set by the setting unit 230. In this event, the conversion unit 240 according to the present embodiment preferably performs the speech-to-text conversion associated with the second utterance information, which is based on the above-described new delimiter position. In other words, the conversion unit 240 according to the present embodiment is capable of performing the speech-to-text conversion based on a new delimiter position with respect to the result obtained by performing the speech recognition based on the collected second utterance information.

Further, the conversion unit 240 according to the present embodiment preferably performs the speech-to-text conversion associated with the first utterance information, which is based on the above-described new delimiter position. In other words, the conversion unit 240 according to the present embodiment is capable of re-converting the converted sentence, which is recognized from the first utterance information, on the basis of the new delimiter position. The speech-to-text conversion performed by the conversion unit 240 will be described later in detail. In addition, the conversion unit 240 is capable of causing the storage unit 250 to store the result obtained by performing the speech-to-text conversion. The conversion unit 240 preferably transmits the result obtained by performing the speech-to-text conversion to the terminal communication unit 260.

(Storage Unit 250)

The storage unit 250 has a function of storing various pieces of information received from the information processing terminal 10 or information generated by each component of the information processing server 20. The storage unit 250 according to the present embodiment is capable of storing, in one example, the result of speech recognition based on the first utterance information and the second utterance information, the comparison result obtained by the comparison unit 220, the information regarding the delimiter position that is set by the setting unit 230, the result of speech-to-text conversion performed by the conversion unit 240, or the like.

(Terminal Communication Unit 260)

The terminal communication unit 260 has a function of communicating with the information processing terminal 10 via the network 30. The terminal communication unit 260 according to the present embodiment is capable of receiving, in one example, the collected first and second utterance information. In addition, the terminal communication unit 260 preferably receives the target information generated by the operation acquisition unit 114.

Furthermore, the terminal communication unit 260 according to the present embodiment is capable of transmitting the information regarding the new delimiter position that is set by the setting unit 230. In addition, the terminal communication unit 260 is capable of transmitting the result of the speech-to-text conversion performed by the conversion unit 240.

The example of the functional configuration of the information processing server 20 according to the present embodiment is described above in detail. As described above, the information processing server 20 according to the present embodiment is capable of comparing the collected first utterance information with the second utterance information and setting a new delimiter position regarding the speech recognition result on the basis of the comparison result. In addition, the information processing server 20 according to the present embodiment is capable of performing the speech-to-text conversion based on the set new delimiter position. The above-described function of the information processing terminal 10 according to the present embodiment makes it possible to flexibly correct the delimiter position unintended by the user, thereby implementing more accurate speech recognition.

Moreover, the functional configuration described above is merely illustrative, and the functional configuration of the information processing server 20 according to the present embodiment is not limited to this example. As described above, some or all of the components included in the information processing server 20 according to the present embodiment are preferably implemented as functions of the information processing terminal 10. In addition, some of the respective components of the information processing server 20 are capable of being implemented as functions of another device. The functional configuration of the information processing terminal 10 according to the present embodiment can be flexibly changed.

Figure 4A:
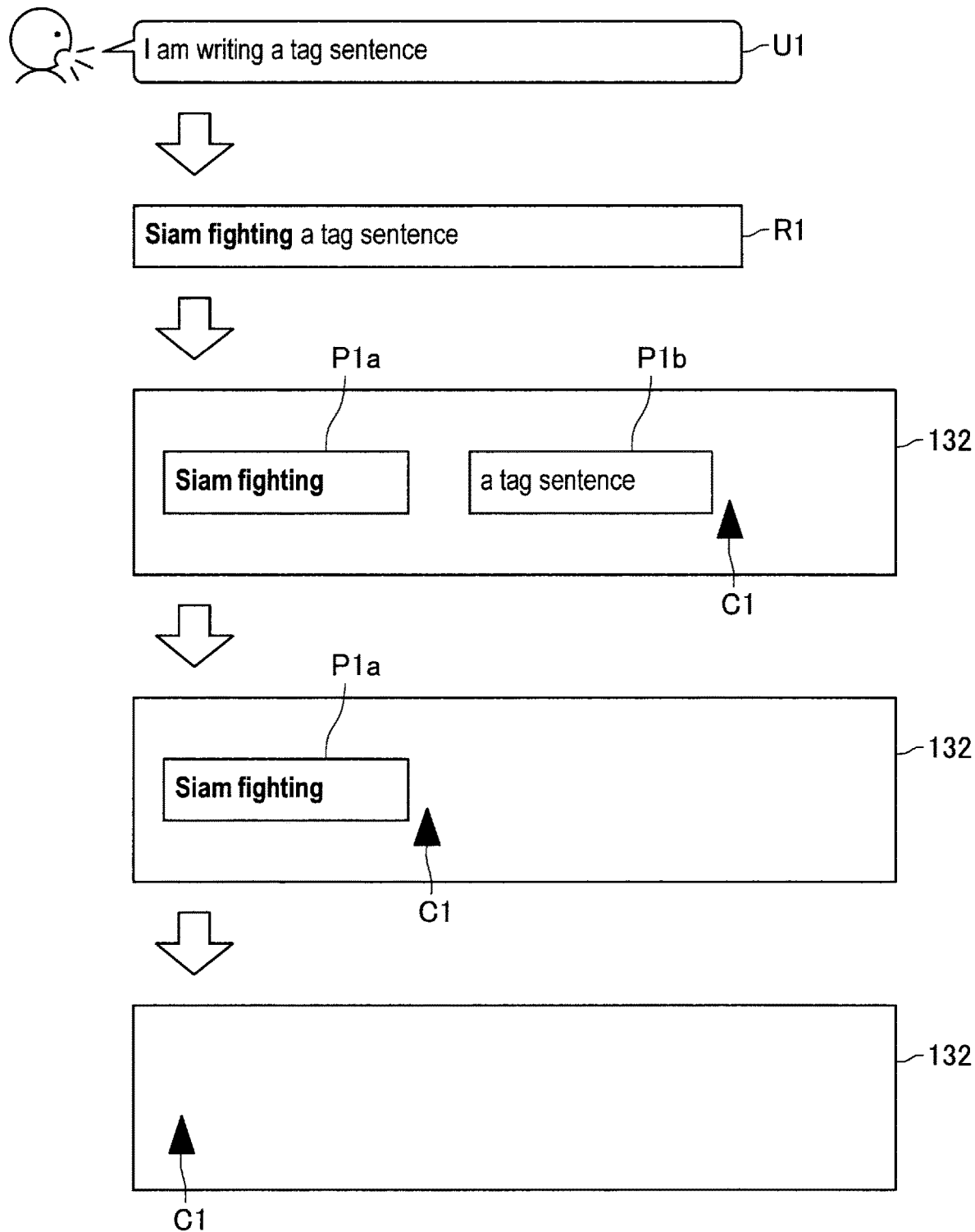
FIG. 4A is a diagram illustrated to describe speech-to-text conversion based on a new delimiter position according to the present embodiment.
Figure 4B:
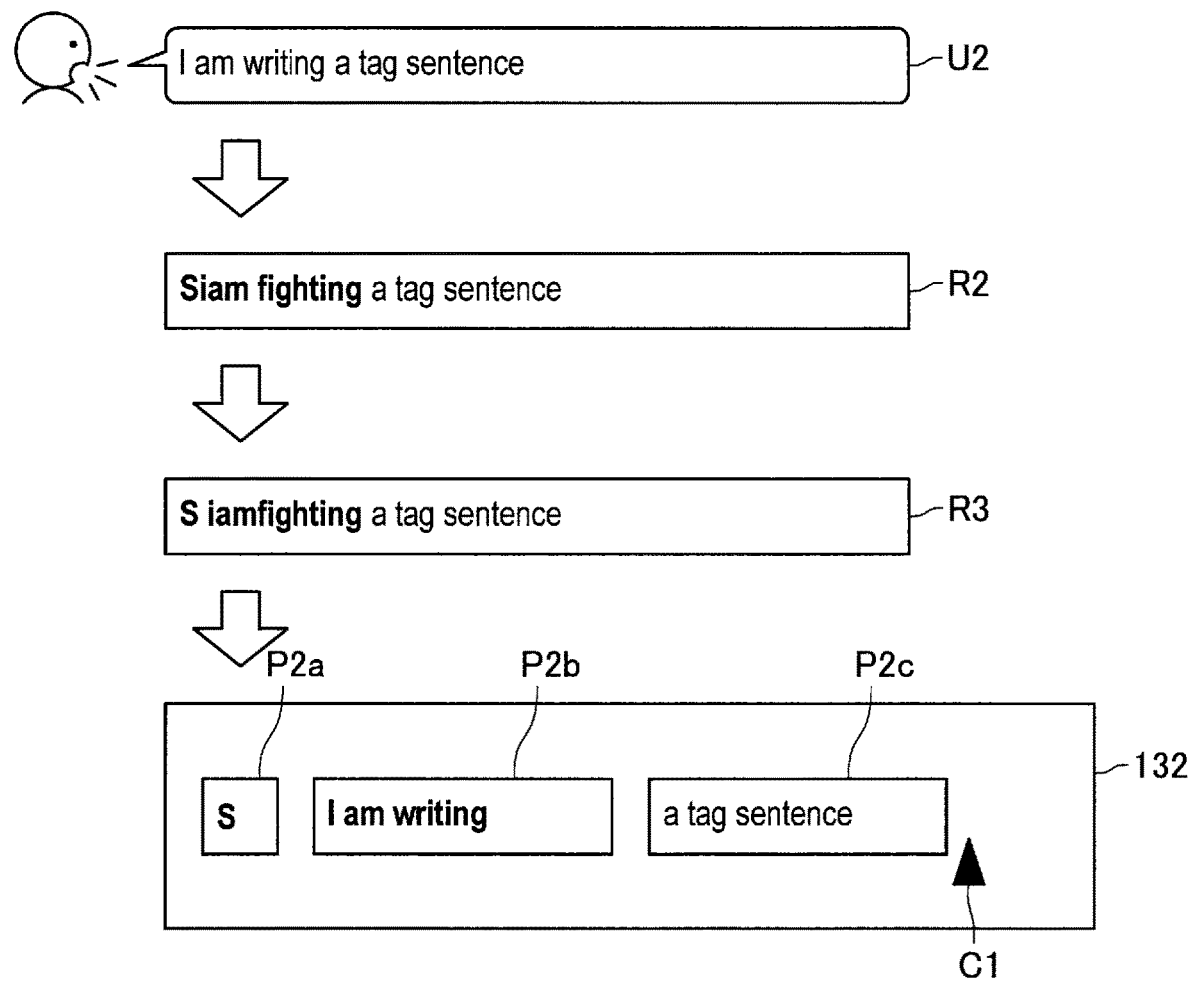
FIG. 4B is a diagram illustrated to describe speech-to-text conversion based on a new delimiter position according to the present embodiment.

1.5. Specific Example of Speech-to-Text Conversion Based on New Delimiter Position A specific example of the speech-to-text conversion based on a new delimiter position according to the present embodiment is now described. FIGS. 4A and 4B are diagrams illustrated to describe the speech-to-text conversion based on a new delimiter position. Referring to FIG. 4A, the user first gives a new utterance U1. In this example, the case where the utterance U1 is "I am writing a tag sentence" is described as an example.

The information processing server 20 according to the present embodiment then receives the first utterance information regarding the utterance U1 and performs the speech recognition based on the first utterance information. FIG. 4A illustrates sound-related information R1 recognized from the utterance U1. In the example illustrated in FIG. 4A, the sound-related information R1 is indicated as "Siam fighting a tag Sentence", which represents that the utterance U1 is erroneously recognized. Moreover, in FIG. 4A, the sound-related information R1 is indicated as a character string, but the sound-related information according to the present embodiment can be a phoneme string or the like.

The information processing server 20 then executes the speech-to-text conversion and the delimiter position setting for the sound-related information R1 and transmits the speech-to-text conversion result and the information regarding the delimiter position to the information processing terminal 10. In addition, the information processing terminal 10 receives the above-described information and causes the display unit 132 to display it. Referring to FIG. 4A, the display unit 132 of the information processing terminal 10 displays two phrases P1*a* and P1*b* based on the delimiter position that is set by the information processing server 20. In addition, a caret C1 indicating the input position of the input operation performed by the user is preferably displayed together on the display unit 132.

Here, the user checks the recognition result displayed on the display unit 132 and performs an operation of deleting an erroneous recognition result. In this event, the user is able to perform, in one example, a deletion operation for each phrase. In the example illustrated in FIG. 4A, the user first deletes the phrase P1b and then deletes the phrase P1a. The user can perform this deletion operation using the operation acquisition unit 114. In addition, in this event, the operation acquisition unit 114 generates target information on the basis of the deleted phrase. In addition, the server communication unit 140 of the information processing terminal 10 transmits the target information generated by the operation acquisition unit 114 to the information processing server 20.

Subsequently, the description of the speech-to-text conversion based on a new delimiter position is continued with reference to FIG. 4B. Moreover, the series of procedures illustrated in FIG. 4B is preferably performed following the processing illustrated in FIG. 4A. Referring to FIG. 4B, the user gives an utterance U2 following the above-described deletion processing. Here, in one example, the utterance U2 can be "I am writing a tag sentence", which is similar to the erroneously recognized utterance U1. In other words, the user deletes the erroneously recognized sentence and then re-inputs the same utterance to obtain a correct recognition result.

The information processing server 20 then receives the second utterance information regarding the utterance U2 and performs the speech recognition based on the second utterance information. FIG. 4B illustrates sound-related information R12 for the utterance U2. In this event, the comparison unit 220 of the information processing server 20 compares the sound-related information R1 recognized from the utterance U1 with the sound-related information R2 recognized from the utterance U2, and determines whether both are similar or identical. In other words, the comparison unit 220 according to the present embodiment is capable of determining whether or not the utterance U2 is re-input to correct the result of recognition based on the utterance U1. In the case of this example, the sound-related information R1 and R2 are the same, thus the comparison unit 220 determines that the utterance U2 is the utterance that is re-input for the utterance U1.

Moreover, in this event, the comparison unit 220 preferably determines a target to be compared with the utterance U2 on the basis of the target information generated by the operation acquisition unit 114. In other words, the comparison unit 220 is capable of specifying utterance information associated with the deleted phrase as the first utterance information.

The setting unit 230 of the information processing server 20 then sets a new delimiter position different from the sound-related information R1 recognized from the utterance U1 on the basis of the determination result obtained by the comparison unit 220. FIG. 4B illustrates sound-related information R3 based on the new delimiter position that is set by the setting unit 230. The conversion unit 240 of the information processing server 20 then executes the speech-to-text conversion based on the new delimiter position that is set by the setting unit 230.

In this case, the setting unit 230 and the conversion unit 240 according to the present embodiment preferably perform the above-described processing on the basis of the confidence of the delimiter position. FIG. 5 is a diagram illustrating an example of the confidence of the delimiter position. FIG. 5 illustrates variation and confidence of a delimiter position in a case where the input utterance is "I am writing a tag sentence". The setting unit 230 and the conversion unit 240 according to the present embodiment preferably set the delimiter position and execute the speech-to-text conversion, respectively, on the basis of the confidence of the delimiter position as illustrated in FIG. 5.

Specifically, the setting unit 230 according to the present embodiment is capable of employing a delimiter position having higher level of confidence in setting the delimiter position. In one example, in the case of the example illustrated in FIG. 4A, the setting unit 230 employs a delimiter position having the highest confidence (confidence level of 0.98), and sets the delimiter position of the sound-related information R1 recognized from the utterance U1.

Further, in resetting the delimiter position, the setting unit 230 according to the present embodiment preferably excludes the delimiter position that is set for the sound-related information recognized from the first utterance information and sets the delimiter position of the sound-related information recognized from the second utterance information by employing the delimiter position having the highest level of confidence. In the example illustrated in FIG. 4B, the setting unit 230 excludes the delimiter position employed for the sound-related information R1 recognized from the utterance U1 and employs the delimiter position having the highest level of confidence (confidence level of 0.95), thereby setting the delimiter position of the sound-related information R3 recognized from the utterance U2. The setting of the delimiter position by the setting unit 230 according to the present embodiment as described above makes it possible to implement speech recognition with higher accuracy.

Further, the information processing server 20 transmits the information regarding the new delimiter position that is set as described above and the result of speech-to-text conversion to the information processing terminal 10. The information processing terminal 10 receives the above-described information and causes the display unit 132 to display it. Referring to FIG. 4B, the display unit 132 of the information processing terminal 10 displays three phrases P2a, P2b, and P2c based on the newly set delimiter position. As described above, the information processing terminal 10 and the information processing server 20 according to the present embodiment make it possible to flexibly correct the delimiter position unintended by the user, thereby implementing the speech recognition with higher accuracy.

Another example of the speech-to-text conversion based on the new delimiter position according to the present embodiment is subsequently described with reference to FIGS. 6A to 6C. In the example described with reference to FIGS. 4A and 4B, the case of recognizing utterance information in English is described, but the information processing server 20 according to the present embodiment is capable of executing processing that handles various languages. The information processing server 20 according to the present embodiment is capable of performing recognition processing for a language having a plurality of notation systems, such as Japanese. The following description is given of an example of setting the delimiter position in a case where the user utters in Japanese. Moreover, the following description is given focusing on the differences from the example described above with reference to FIGS. 4A and 4B.

Figure 6A:
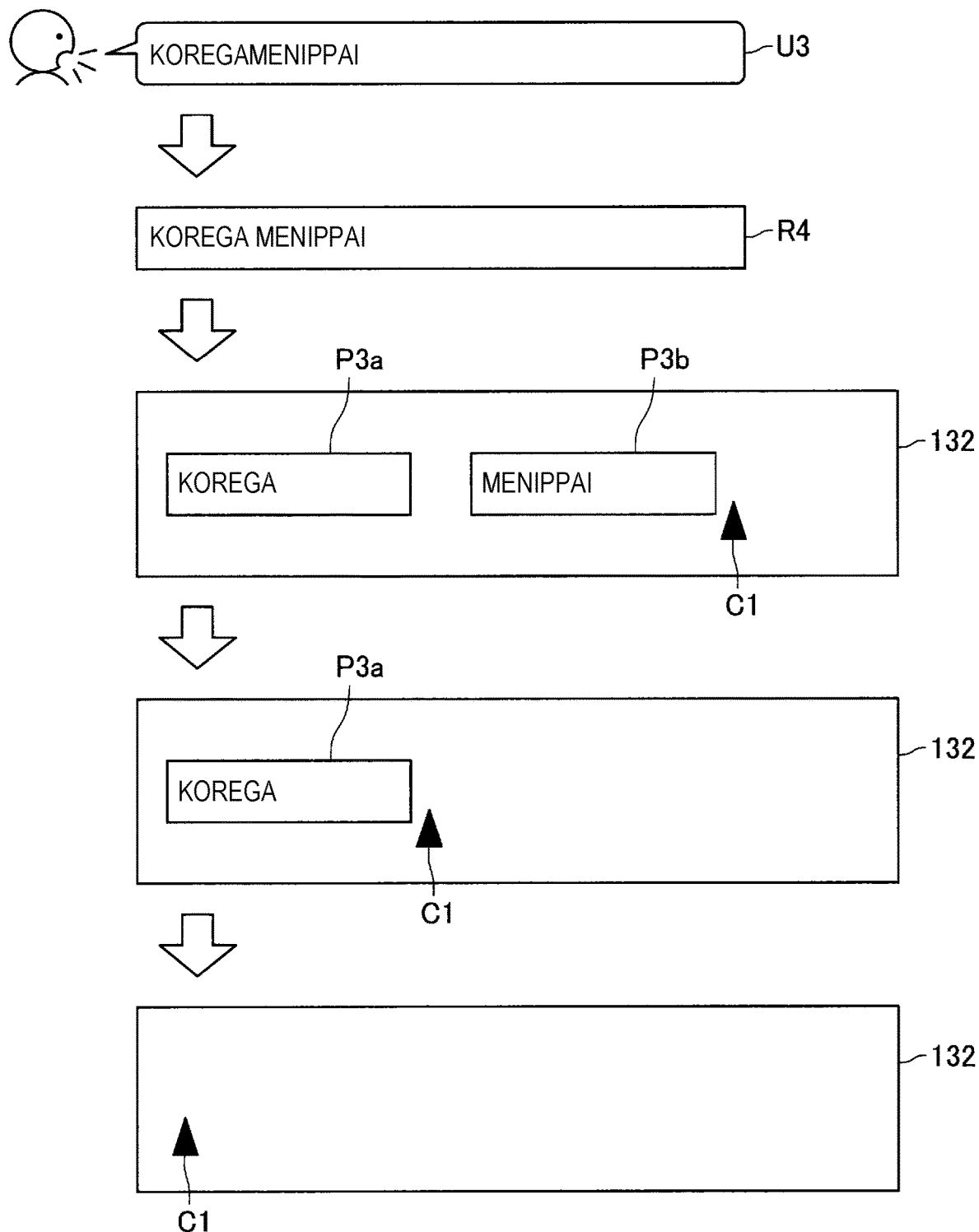
FIG. 6A is a diagram illustrated to describe another example of the speech-to-text conversion based on a new delimiter position according to the present embodiment.
Figure 6B:
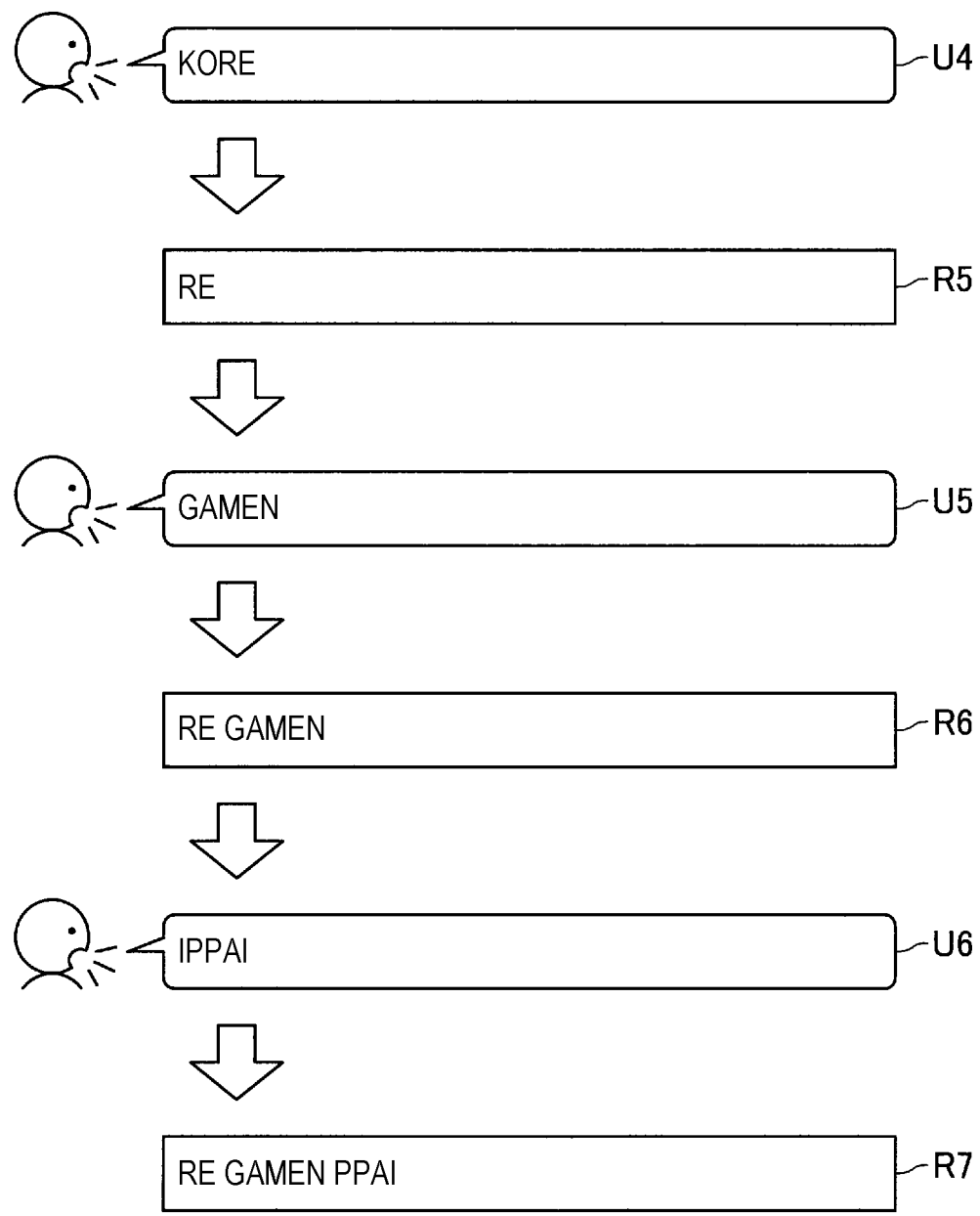
FIG. 6B is a diagram illustrated to describe another example of the speech-to-text conversion based on a new delimiter position according to the present embodiment.

Referring to FIG. 6A, the user first gives a new utterance U3. In this example, a case where the utterance U3 is "Koregamenippai" is described as an example. The information processing server 20 according to the present embodiment then receives the first utterance information regarding the utterance U3 and performs the speech recognition based on the first utterance information. FIG. 6A illustrates sound-related information R4 for the utterance U3. In the example illustrated in FIG. 6A, the sound-related information R4 is indicated as "Koregamenippai", which represents that the utterance U3 is correctly recognized. Moreover, in FIG. 6A, the sound-related information R4 is indicated as a character string, but the sound-related information according to the present embodiment can be a phoneme string or the like.

The information processing server 20 then executes the speech-to-text conversion and the setting of the delimiter position for the sound-related information R4, and transmits the result of speech-to-text conversion and information regarding the delimiter position to the information processing terminal 10. In addition, the information processing terminal 10 receives the above-described information and causes the display unit 132 to display it. Referring to FIG. 6A, the display unit 132 of the information processing terminal 10 displays two phrases P3a and P3b based on the delimiter position that is set by the information processing server 20. In FIG. 6A, the phrases P3a and P3b are converted with the contents "Korega" ("this is" in English) and "Menippai" ("a bowl of noodle" in English), respectively. As described above, in a language having a plurality of notation systems such as Japanese, it is assumed that the character string is secondarily converted on the basis of the delimiter position.

However, here, in a case where the user intends that the utterance U3 is "Koregamenippai" ("this screen is full" in English), even if the sound-related information R4 is correctly recognized, erroneous speech-to-text conversion is performed depending on the delimiter position to be set. In this case, as in the example illustrated in FIG. 4A, the user can delete the phrase P3b and then delete the phrase P3a. In this event, the operation acquisition unit 114 generates the target information on the basis of the deleted phrase, and the server communication unit 140 transmits the target information generated by the operation acquisition unit 114 to the information processing server 20.

The use is able to give an utterance again to obtain the correct recognition result after performing the above-described deletion processing, but in this event, the user is also able to input an utterance by delimiting it in units of phrases or words to obtain the result of recognition based on the intended delimiter position. FIG. 6B illustrates an example of a case where the user inputs an utterance by delimiting it in units of phrases.

It is however known that typical speech recognition has low recognition accuracy for short utterances. Referring to FIG. 6B, the user inputs utterances U4 to U6 in units of intended phrases. In this example, the utterances U4 to U6 can be "Kore", "Gamen", and "Ippai", respectively. However, in sound-related information R5 to R7 respectively recognized on the basis of the utterances U4 to U6, these utterances are recognized as "Re", "Re gamen", and "Re kamen ppai", respectively, which is found that these do not conform to the user's intention.

To avoid such misrecognition as described above, even in a case where the user inputs an utterance in Japanese, the user can input the entire utterance without delimiting it. The information processing server 20 according to the present embodiment is capable of resetting the delimiter position even in a case where a language having a plurality of notation systems such as Japanese is input.

Figure 6C:
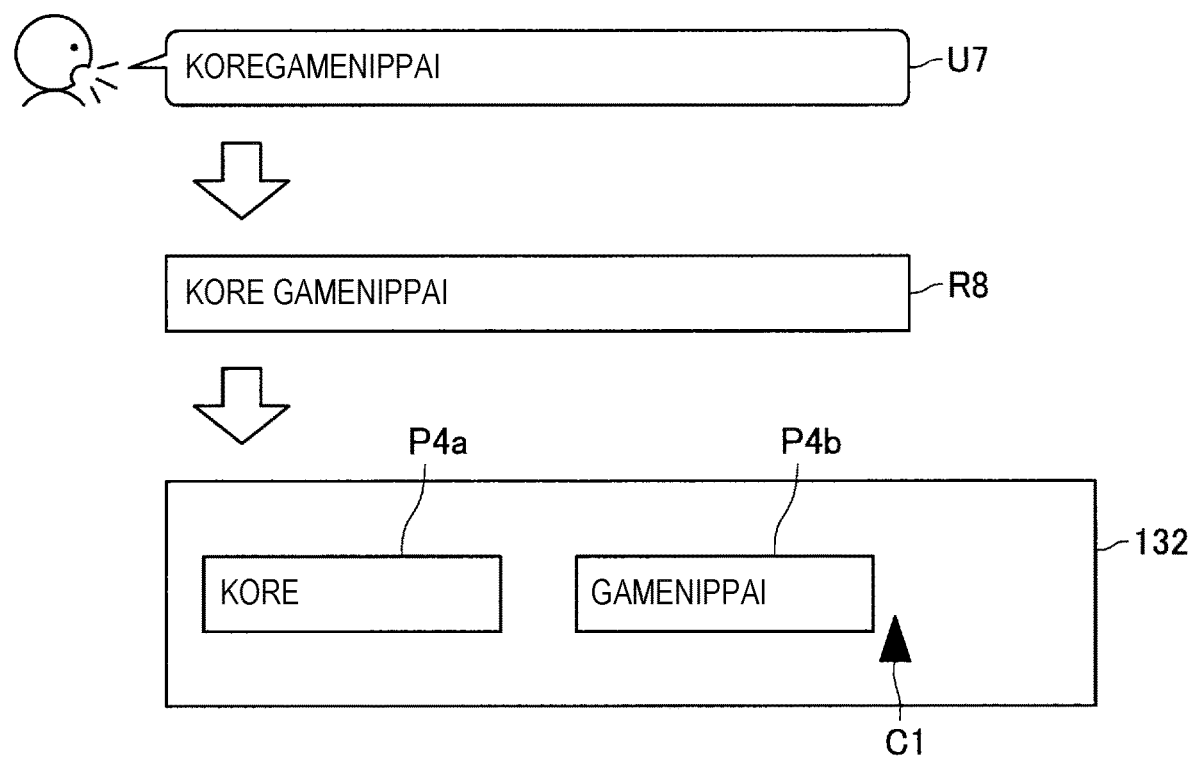
FIG. 6C is a diagram illustrated to describe another example of the speech-to-text conversion based on a new delimiter position according to the present embodiment.

FIG. 6C illustrates an example of a case where the user re-inputs the entire utterance. The series of procedures illustrated in FIG. 6C are preferably performed following the processing illustrated in FIG. 6A. Referring to FIG. 6C, the user performs an utterance U7 following the deletion processing. Here, the utterance U7 can be "Koregamenippai", which is similar to the utterance U3 that is erroneously converted. In addition, sound-related information R8 recognized from the utterance U7 is correctly recognized, which is similar to the sound-related information R4 recognized from the utterance U4. The comparison unit 220 of the information processing server 20 thus preferably determines that the sound-related information R4 and R8 coincide with each other.

The setting unit 230 and the conversion unit 240 of the information processing server 20 then execute the setting of a new delimiter position and the speech-to-text conversion on the basis of the confidence of the delimiter position, which is similar to the example described with reference to FIGS. 4A and 4B. In this event, the setting unit 230 and the conversion unit 240 preferably perform the above-described processing on any of the sound-related information R4 or R8. In other words, the setting unit 230 and the conversion unit 240 according to the present embodiment preferably perform the setting of the delimiter position for the sound-related information R8 recognized from the utterance U7 corresponding to the second utterance information and the speech-to-text conversion based on it, respectively. On the other hand, the setting unit 230 and the conversion unit 240 preferably perform the resetting of a new delimiter position for the sound-related information R4 recognized from the utterance U4 corresponding to the first utterance information and the speech-to-text conversion based on it, respectively. In this case, the use of the existing processing result makes it possible to reduce the burden of processing.

Further, the information processing terminal 10 receives the information regarding the new delimiter position that is set as described above and the result of speech-to-text conversion and controls the display of the display unit 132 on the basis of the information, which is similar to the example described with reference to FIGS. 4A and 4B. Referring to FIG. 6C, the display unit 132 of the information processing terminal 10 displays two phrases P4a and P4b based on the newly set delimiter position. As described above, the information processing server 20 according to the present embodiment is capable of flexibly correcting the delimiter position unintended by the user even in the case where the utterance language has a plurality of notation systems.

The specific example of the speech-to-text conversion based on the new delimiter position according to the present embodiment is described above. Moreover, although the above description is given of the case where the comparison unit 220 specifies the first utterance information on the basis of the target information as an example, the specifying of the first utterance information according to the present embodiment is not limited to this example. The comparison unit 220 according to the present embodiment preferably compares a plurality of pieces of utterance information with the second utterance information, which are stored in the storage unit 250 and specifies utterance information having the highest confidence as the first utterance information. In this case, even in a case where the deletion operation by the user is not performed, it is possible to implement the speech recognition based on the delimiter position intended by the user merely by re-inputting the utterance.

Further, although the above description is given of the case where the first utterance information is one as an example, the first utterance information according to the present embodiment can be plural. In this case, the setting unit 230 according to the present embodiment preferably sets a new delimiter position different from the delimiter position that is set for each of the plurality of pieces of first utterance information.

Further, examples of the input operation performed by the user according to the present embodiment include a confirmation operation of the conversion result or the like. In this case, the information processing server 20 according to the present embodiment is capable of executing processing on the basis of the second utterance information being input before execution of the above-described confirmation operation. The execution based on the user's confirmation operation by the information processing server 20 makes it possible to deal with the case where the user desires to repeatedly input the same sentence or the like.

Further, although the above description is given of the case where the result of recognition based on the user's utterance information is output by the display unit 132 as an example, the recognition result according to the present embodiment can be output by the speech output unit 134. The terminal control unit 120 according to the present embodiment is also capable of causing the speech output unit 134 to output artificial speech or the like on the basis of the speech-to-text conversion result and the information regarding the delimiter position received from the information processing server 20.

1.6. Operation Procedure in Information Processing Server 20

The operation procedure of the information processing server 20 according to the present embodiment is now described.
(Processing Procedure of First Utterance Information)

The processing procedure regarding the first utterance information is first described with reference to FIG. 7. FIG. 7 is a flowchart illustrating the processing procedure by the information processing server 20 on the first utterance information.

Referring to FIG. 7, the terminal communication unit 260 of the information processing server 20 first receives the first utterance information collected by the information processing terminal 10 (S1110).

The speech recognition unit 210 then acquires the sound-related information based on the first utterance information (S1120).

The speech recognition unit 210 subsequently executes the speech recognition based on the first utterance information (1130).

The setting unit 230 then sets the delimiter position on the basis of the result of the speech recognition in step S1130 (S1140). Moreover, the setting of the delimiter position is preferably implemented as a function of the speech recognition unit 210. In this case, the speech recognition unit 210 is capable of performing the speech recognition as a process of speech recognition.
(Setting Procedure of New Delimiter Position Based on Target Information)

Figure 8:
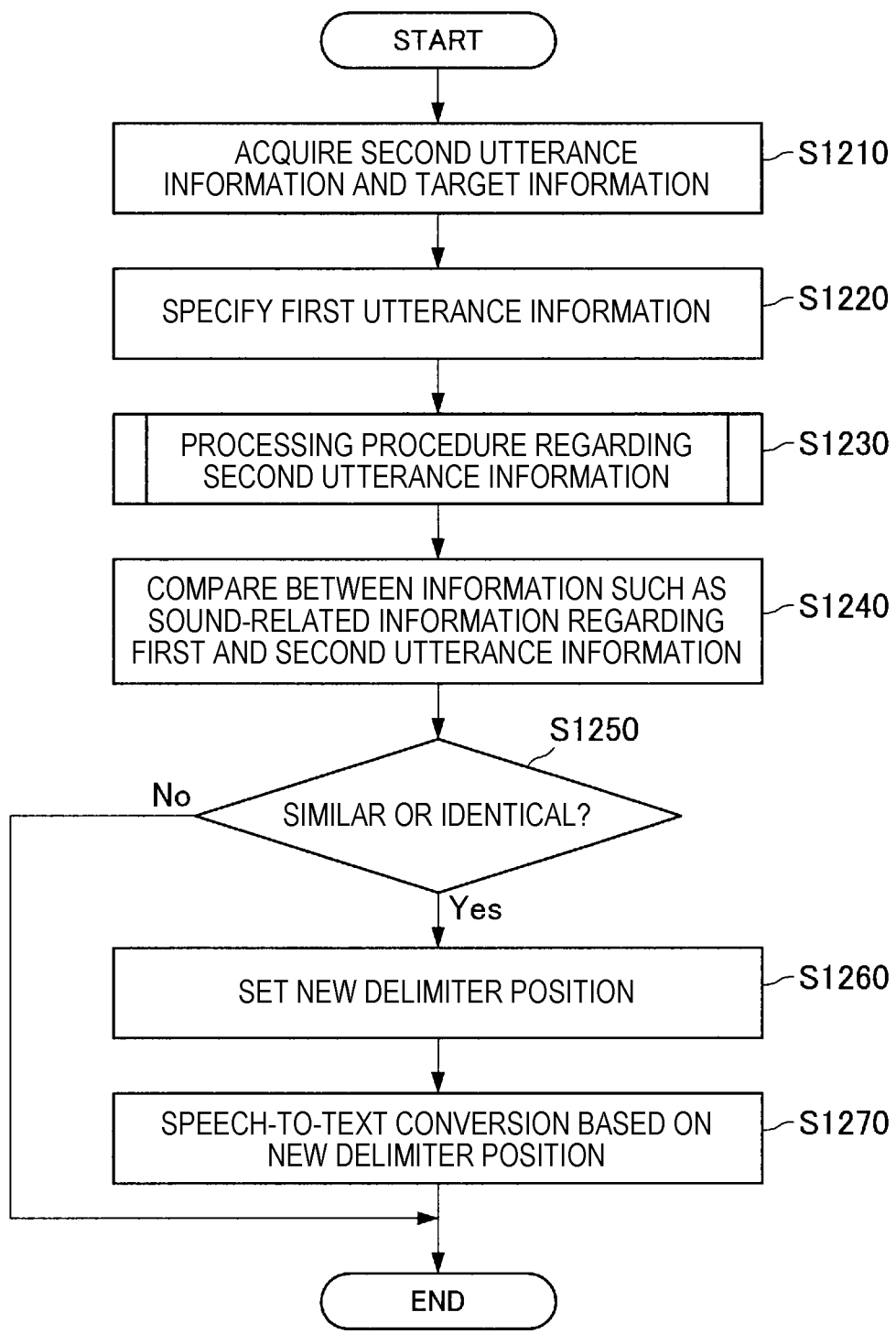
FIG. 8 is a flowchart illustrating a setting procedure of a new delimiter position based on target information by the information processing server according to the present embodiment.

The setting procedure of the new delimiter position based on the target information is now described with reference to FIG. 8. FIG. 8 is a flowchart illustrating the setting procedure of the new delimiter position based on the target information, which is performed by the information processing server 20.

Referring to FIG. 8, the terminal communication unit 260 first receives the second utterance information and the target information collected by the information processing terminal 10 (S1210).

The comparison unit 220 then specifies the first utterance information on the basis of the target information received in step S1210 (S1220).

The information processing server 20 then executes the processing procedure regarding the second utterance information (S1230). The processing procedure regarding the second utterance information will be described later in detail.

The comparison unit 220 then compares the similarity between the sound-related information regarding the first utterance information specified in step S1220 with the sound-related information regarding the second utterance information acquired in step S1230 (S1240). In this event, the comparison unit 220 can compare only the sound-related information regarding the first utterance information with the sound-related information regarding the second utterance information, or can compare the character strings recognized from both.

The comparison unit 220 subsequently determines whether the sound-related information regarding the first utterance information and the sound-related information regarding the second utterance information are similar or identical (S1250).

Here, in a case where these two pieces of sound-related information coincide with each other (Yes in S1250), the setting unit 230 sets a new delimiter position (S1260). In this event, the setting unit 230 preferably sets a new delimiter position on the basis of the confidence of the delimiter position.

The conversion unit 240 then performs the speech-to-text conversion based on the new delimiter position that is set in step S1260 (S1270). In the case where the spoken language is Japanese, the conversion unit 240 is capable of performing reconversion of Chinese characters on the basis of the new delimiter position.
(Processing Procedure Regarding Second Utterance Information)

Figure 9:
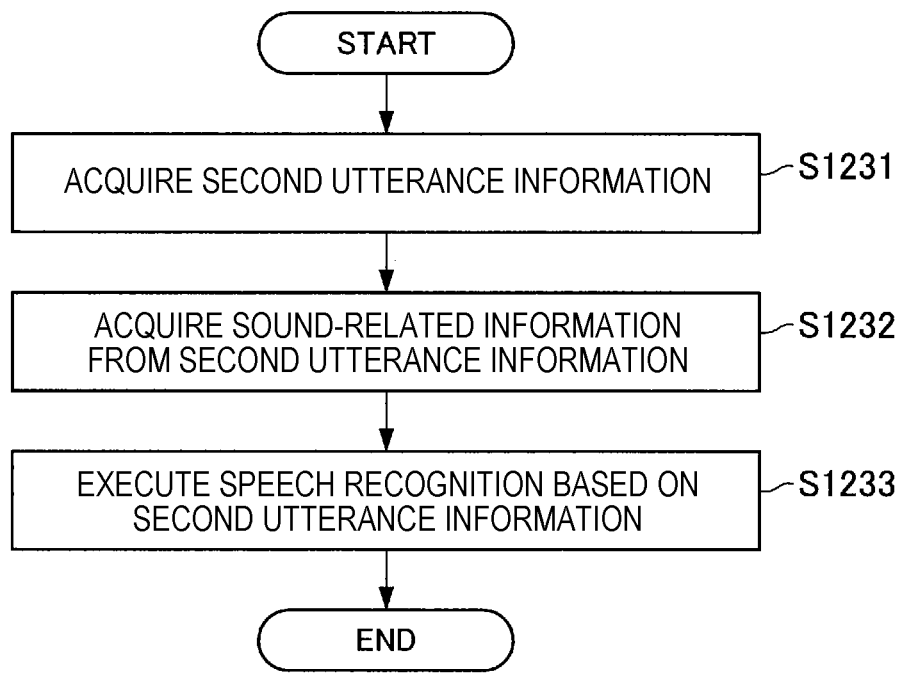
FIG. 9 is a flowchart illustrating a setting procedure by an information processing server on second utterance information according to the present embodiment.

The processing procedure regarding the second utterance information is now described with reference to FIG. 9. FIG. 9 is a flowchart illustrating the procedure of processing performed by the information processing server 20 on the second utterance information. The processing described in the following may correspond to step S1230 in FIG. 8.

Referring to FIG. 9, first, the speech recognition unit 210 of the information processing server 20 acquires the second utterance information received by the terminal communication unit 260 (S1231).

The speech recognition unit 210 then acquires the sound-related information based on the second utterance information (S1232).

The speech recognition unit 210 subsequently executes the speech recognition based on the second utterance information (1233). Moreover, the speech recognition in step S1233 is not necessarily executed. The comparison unit 220 according to the present embodiment is capable of executing the processing of steps S1240 and S1250 in FIG. 8 using only the sound-related information regarding the second utterance information acquired in step S1232.
(Setting Procedure of New Delimiter Position Only Based on Utterance Information)

Figure 10:
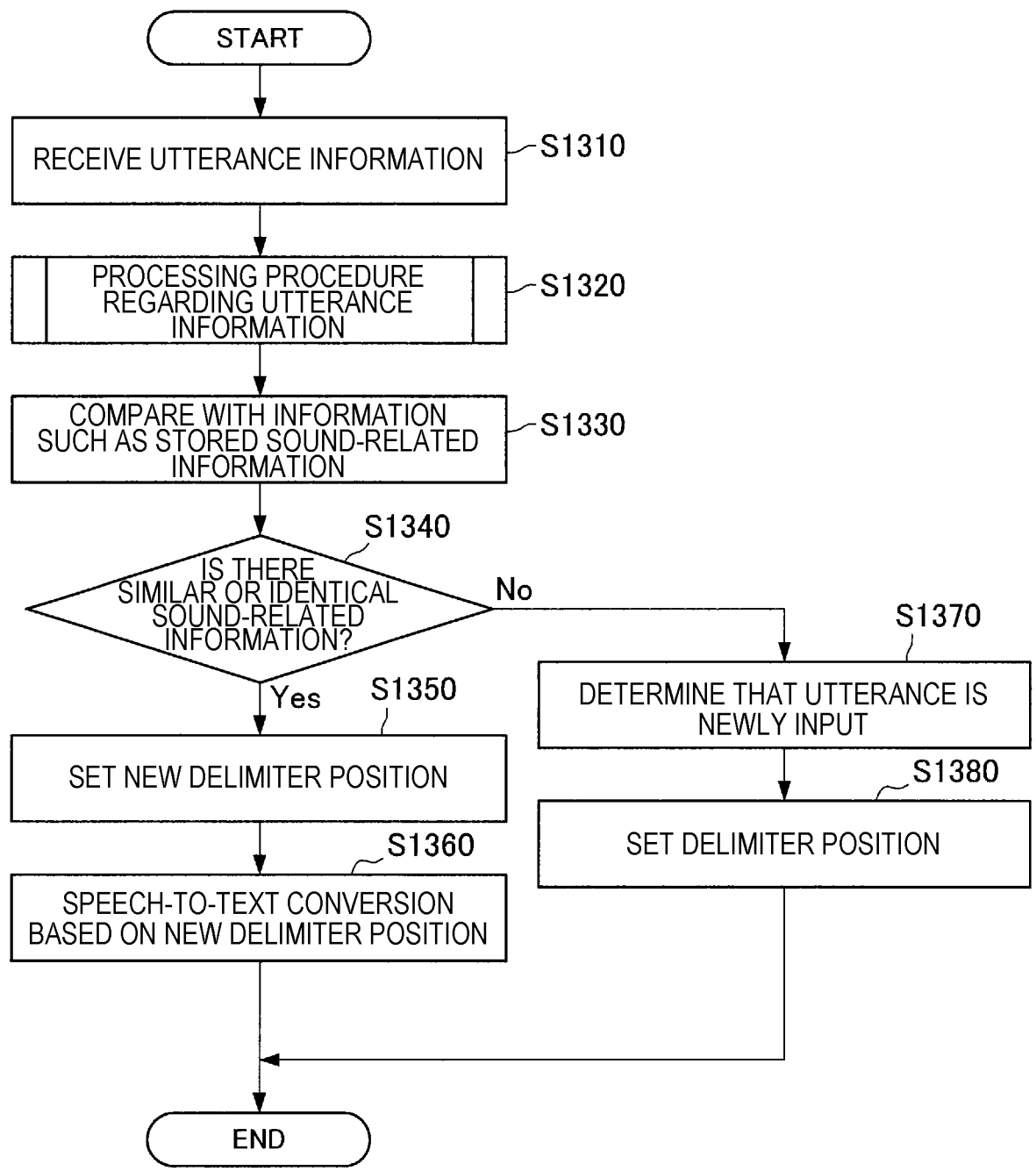
FIG. 10 is a flowchart illustrating a setting procedure of a new delimiter position only based on utterance information by the information processing server according to the present embodiment.

The setting procedure of the new delimiter position only based on the utterance information is now described with reference to FIG. 10. FIG. 10 is a flowchart illustrating the procedure of setting the new delimiter position only based on the utterance information by the information processing server 20.

Referring to FIG. 10, first, the terminal communication unit 260 of the information processing server 20 receives the utterance information and the target information collected by the information processing terminal 10 (S1310). Moreover, the target information is not received in performing step S1310, which is unlike the case illustrated in FIG. 8, so it is not specified whether the received utterance information is the first utterance information or the second utterance information.

The information processing server 20 then executes the processing procedure regarding the utterance information received in step S1310 (S1320). Here, the processing procedure regarding the utterance information in step S1320 is preferably the same as that regarding the second utterance information described with reference to FIG. 9, so the description thereof is omitted.

The comparison unit 220 then compares the sound-related information regarding the utterance information acquired in step S1320 with the plurality of pieces of sound-related information stored in the storage unit 250 (S1330). In this event, the comparison unit 220 can compare only between the sound-related information, or can compare between the recognized character strings.

The comparison unit 220 subsequently determines whether or not there is the sound-related information similar or identical to the sound-related information regarding the utterance information acquired in step S1320 (S1340).

Here, in a case where there is the sound-related information similar or identical to the sound-related information regarding the utterance information acquired in step S1320 (Yes in S1340), the setting unit 230 sets a new delimiter position (S1350).

The conversion unit 240 then performs the speech-to-text conversion based on the new delimiter position that is set in step S1350 (S1360).

On the other hand, in a case where there is no sound-related information similar or identical to the sound-related information regarding the utterance information acquired in step S1320 (No in S1340), the comparison unit 220 determines that the utterance information received in step S1310 is newly input information (S1370). In other words, the comparison unit 220 is capable of determining the utterance information received in step S1310 as the first utterance information.

The setting unit 230 then sets the delimiter position associated with the utterance information received in step S1310 (S1380).

2. Exemplary Hardware Configuration

Figure 11:
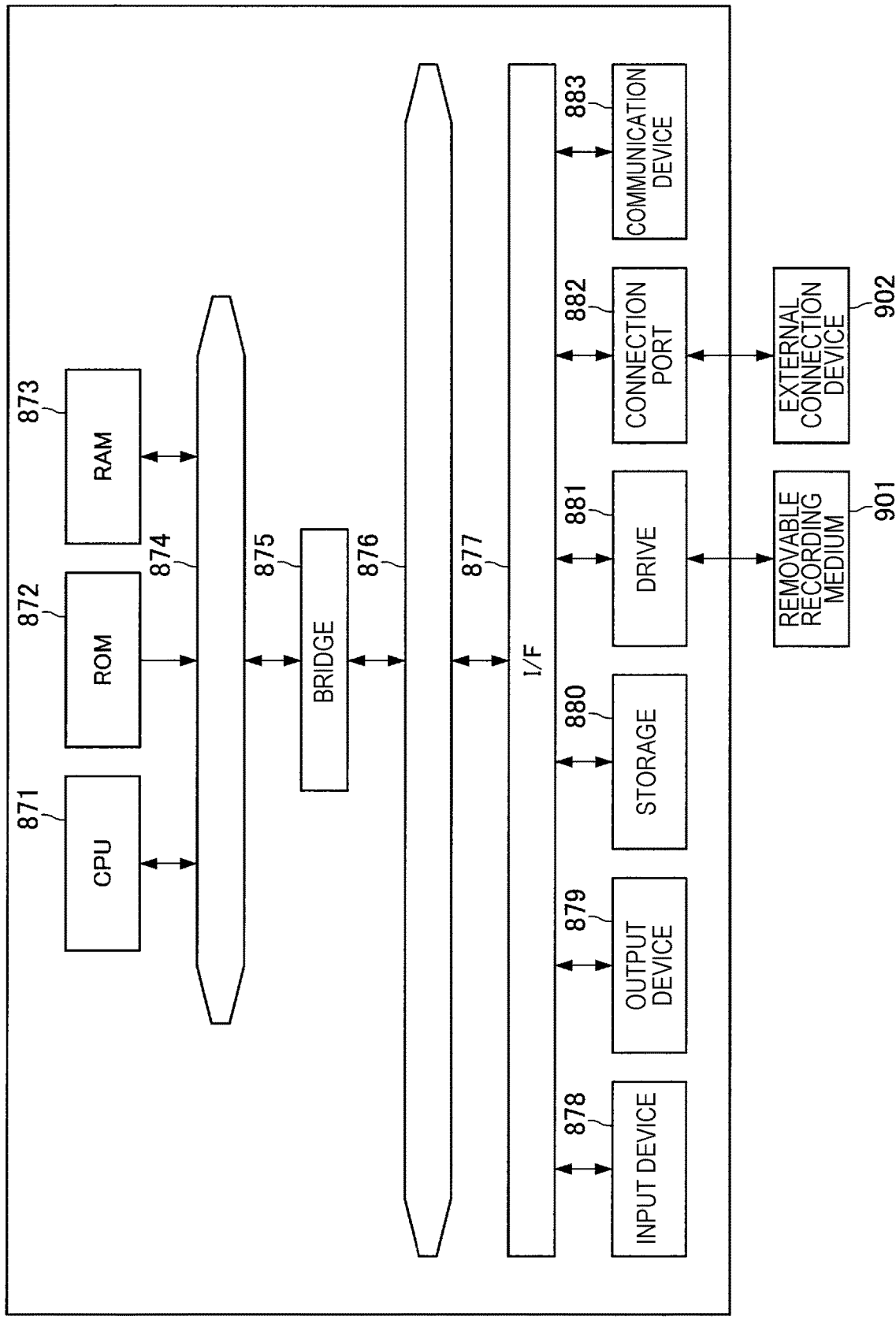
FIG. 11 is an exemplary hardware configuration according to the present disclosure.

An example of the hardware configuration common to the information processing terminal 10 and the information processing server 20 according to the present disclosure is now described. FIG. 11 is a block diagram illustrating an example of the hardware configuration of the information processing terminal 10 and the information processing server 20 according to the present disclosure. Referring to FIG. 11, the information processing terminal 10 and the information processing server 20 include, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.

(CPU 871)

The CPU 871 functions as, in one example, an arithmetic processing unit or a control device, and controls some or all of the operations of each component on the basis of various programs recorded in the ROM 872, the RAM 873, the storage 880, or a removable recording medium 901.

(ROM 872 and RAM 873)

The ROM 872 is a means for storing programs read into the CPU 871, data used for operation, or the like. The RAM 873 temporarily or permanently stores, in one example, a program to be read into the CPU 871, various parameters appropriately changing in executing the program, or the like.

(Host Bus 874, Bridge 875, External Bus 876, and Interface 877)

The CPU 871, the ROM 872, and the RAM 873 are mutually connected via, in one example, the host bus 874 capable of high-speed data transmission. On the other hand, the host bus 874 is connected to the external bus 876 having a relatively low data transmission speed, in one example, via the bridge 875. In addition, the external bus 876 is connected to various components via the interface 877.

(Input Device 878)

Examples of the input device 878 include a mouse, a keyboard, a touch panel, buttons, a switch, a lever, or the like. Furthermore, examples of the input device 878 include a remote controller capable of transmitting a control signal using infrared rays or other radio waves (hereinafter referred to as a remote controller). In addition, the input device 878 includes a speech input device such as a microphone.

(Output Device 879)

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like.

(Storage 880)

The storage 880 is a device used to store various types of data. Examples of the storage 880 include a magnetic storage device such as hard disk drives (HDDs), a semiconductor storage device, an optical storage device, a magneto-optical storage device, or the like.

(Drive 881)

The drive 881 is a device that reads information recorded on the removable recording medium 901 such as a magnetic disk, an optical disk, a magneto-optical disk, or a semiconductor memory or writes information to the removable recording medium 901.

(Removable Recording Medium 901)

Examples of the removable recording medium 901 include a DVD medium, a Blu-ray (registered trademark) medium, an HD DVD medium, various kinds of semiconductor storage media, or the like. Of course, the removable recording medium 901 is preferably, in one example, an IC card or an electronic device mounted with a contactless IC chip.

(Connection Port 882)

The connection port 882 is a port used for connection with an external connection device 902, such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, an IC recorder, or the like.

(Communication Device 883)

The communication device 883 is a communication device used for connection with a network, and examples thereof include a communication card for wired or wireless LAN, Bluetooth (registered trademark), or wireless USB (WUSB), a router for optical communication, a router for asymmetric digital subscriber line (ADSL), or a modem for various communications.

3. Concluding Remarks

As described above, the information processing terminal 10 according to the present disclosure is capable of receiving information regarding a new delimiter position different from the result of the speech-to-text conversion associated with the first utterance information and controlling the output of the new conversion result obtained by performing the speech-to-text conversion based on the new delimiter position. In addition, the information processing server 20 according to the present disclosure is capable of comparing the collected first utterance information with the second utterance information and setting a new delimiter position regarding the result of speech recognition on the basis of the comparison result. In addition, the information processing server 20 is capable of performing the speech-to-text conversion based on the new delimiter position that is set. Such a configuration makes it possible to correct more flexibly the recognized sentence.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the respective steps in the processing of the information processing server 20 in this specification are not necessarily executed in chronological order in accordance with the order illustrated in the flowcharts. In one example, the respective steps in the processing of the information processing server 20 can be processed in the order different from the order illustrated in the flowcharts, or can also be processed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a comparison unit configured to compare first sound-related information obtained from collected first utterance information with second sound-related information obtained from collected second utterance information; and
a setting unit configured to set a new delimiter position different from a result of speech-to-text conversion associated with the first utterance information on a basis of a comparison result obtained by the comparison unit.

(2)
The information processing device according to (1), further including:
a conversion unit configured to perform speech-to-text conversion on a basis of the new delimiter position.

(3)
The information processing device according to (2),
in which the conversion unit performs speech-to-text conversion associated with the second utterance information on the basis of the new delimiter position.

(4)
The information processing device according to (2) or (3),
in which the conversion unit performs the speech-to-text conversion associated with the first utterance information on the basis of the new delimiter position.

(5)
The information processing device according to any of (1) to (4), further including:
a reception unit configured to receive the first utterance information and the second utterance information.

(6)
The information processing device according to (5),
in which the reception unit receives target information used to specify the first utterance information, and
the comparison unit compares the first sound-related information with the second sound-related information on a basis of the target information.

(7)
The information processing device according to any of (1) to (6), further including:
a transmission unit configured to transmit information regarding the new delimiter position set by the setting unit.

(8)
The information processing device according to (7),
in which the transmission unit transmits a result of the speech-to-text conversion based on the new delimiter position.

(9)
The information processing device according to any of (1) to (8), further including:
a speech recognition unit configured to perform speech recognition on a basis of the first utterance information or the second utterance information.

(10)
An information processing device including:
a reception unit configured to receive information regarding a new delimiter position different from a result of speech-to-text conversion associated with collected first utterance information; and
an output control unit configured to control output of a new conversion result obtained by performing speech-to-text conversion on a basis of the new delimiter position,
in which the new delimiter position is set on a basis of a result obtained by comparing first sound-related information obtained from the collected first utterance information with second sound-related information obtained from collected second utterance information.

(11)
The information processing device according to (10),
in which the output control unit causes an output unit to output the new conversion result and the new delimiter position in association with each other.

(12)
The information processing device according to (10) or (11), further including:
a transmission unit configured to transmit the first utterance information and the second utterance information.

(13)
The information processing device according to (12),
in which the transmission unit transmits target information used to specify the first utterance information, and
the reception unit receives information regarding the new delimiter position set on a basis of the target information.

(14)

The information processing device according to any of (10) to (13), in which the reception unit receives the new conversion result.

(15)

The information processing device according to any of (10) to (13), further including:

a conversion unit configured to perform the speech-to-text conversion on the basis of the new delimiter position.

(16)

The information processing device according to (13), further including:

an operation acquisition unit configured to detect an input operation by a user and generate the target information on a basis of the input operation.

(17)

The information processing device according to any of (10) to (16), further including:

an output unit to output the new conversion result on a basis of control by the output control unit.

(18)

The information processing device according to any of (10) to (17), further including:

a speech collection unit configured to collect the first utterance information and the second utterance information, in which the second utterance information is acquired after acquisition of the first utterance information.

(19)

An information processing method including:

comparing, by a processor, first sound-related information obtained from collected first utterance information with second sound-related information obtained from collected second utterance information; and setting a new delimiter position different from a result of speech-to-text conversion associated with the first utterance information on a basis of a result obtained by comparing the first sound-related information with the second sound-related information.

(20)

An information processing method including:

receiving, by a processor, information regarding a new delimiter position different from a result of speech-to-text conversion associated with collected first utterance information; and controlling output of a new conversion result obtained by performing speech-to-text conversion on a basis of the new delimiter position, in which the new delimiter position is set on a basis of a result obtained by comparing first sound-related information obtained from the collected first utterance information with second sound-related information obtained from collected second utterance information.

REFERENCE SIGNS LIST 10 information processing terminal
110 input unit
112 speech collection unit
114 operation acquisition unit
120 terminal control unit
130 output unit
132 display unit
134 speech output unit
140 server communication unit
information processing server
210 speech recognition unit
220 comparison unit
230 setting unit
240 conversion unit
250 storage unit
260 terminal communication unit

The invention claimed is:

1. An information processing device comprising:
   at least one processor configured to
   compare first sound-related information obtained from collected first utterance information with second sound-related information obtained from collected second utterance information,
   set a new delimiter position different from a result of speech-to-text conversion associated with the first utterance information based on a comparison result indicating that the first utterance information is similar to the second utterance information, and
   perform speech-to-text conversion based on the new delimiter position,
   wherein the new delimiter position is set from initially delimiting one or more grouped phrases to delimiting one or more words grouped within each phrase of the initially delimited one or more grouped phrases, and
   wherein the new delimiter position is set based on a confidence level determined for each variation of the new delimiter position.

2. The information processing device according to claim 1,
   wherein the at least one processor performs speech-to-text conversion associated with the second utterance information on the basis of the new delimiter position.

3. The information processing device according to claim 1,
   wherein the at least one processor performs the speech-to-text conversion associated with the first utterance information on the basis of the new delimiter position.

4. The information processing device according to claim 1,
   wherein the at least one processor is further configured to receive the first utterance information and the second utterance information.

5. The information processing device according to claim 4,
   wherein the at least one processor is further configured to receive target information used to specify the first utterance information, and
   compare the first sound-related information with the second sound-related information based on the target information.

6. The information processing device according to claim 1,
   wherein the at least one processor is further configured to initiate transmission of information regarding the new delimiter position.

7. The information processing device according to claim 6,
   wherein the at least one processor is further configured to transmit a result of the speech-to-text conversion based on the new delimiter position.

8. The information processing device according to claim 1,
   wherein the at least one processor is further configured to perform speech recognition based on the first utterance information or the second utterance information.

9. An information processing device comprising:
at least one processor configured to
receive information regarding a new delimiter position different from a result of speech-to-text conversion associated with collected first utterance information,
control output of a new conversion result obtained by performing speech-to-text conversion based on the new delimiter position, and
initiate output of the new conversion result and the new delimiter position in association with each other,
wherein the new delimiter position is set based on a comparison result obtained by comparing first sound-related information obtained from the collected first utterance information with second sound-related information obtained from collected second utterance information, the comparison result indicating that the first sound-related information is similar to the second sound-related information,
wherein the new delimiter position is set from initially delimiting one or more grouped phrases to delimiting one or more words grouped within each phrase of the initially delimited one or more grouped phrases, and
wherein the new delimiter position is set based on a confidence level determined for each variation of the new delimiter position.

10. The information processing device according to claim 9,
wherein the at least one processor is further configured to transmit the first utterance information and the second utterance information.

11. The information processing device according to claim 10,
wherein the at least one processor is further configured to transmit target information used to specify the first utterance information, and
wherein the at least one processor receives the information regarding the new delimiter position set based on the target information.

12. The information processing device according to claim 11,
wherein the at least one processor is further configured to detect an input operation by a user and generate the target information based on the input operation.

13. The information processing device according to claim 9,
wherein the at least one processor is further configured to receive the new conversion result.

14. The information processing device according to claim 9,
wherein the at least one processor is further configured to perform the speech-to-text conversion on the basis of the new delimiter position.

15. The information processing device according to claim 9, further comprising:
an output configured to output the new conversion result based on the initiated output.

16. The information processing device according to claim 9,
wherein the at least one processor is further configured to collect the first utterance information and the second utterance information,
wherein the second utterance information is acquired after acquisition of the first utterance information.

17. An information processing method comprising:
comparing, by a processor, first sound-related information obtained from collected first utterance information with second sound-related information obtained from collected second utterance information;
setting a new delimiter position different from a result of speech-to-text conversion associated with the first utterance information based on a comparison result indicating that the first sound-related information is similar to the second sound-related information; and
perform speech-to-text conversion based on the new delimiter position,
wherein the new delimiter position is set from initially delimiting one or more grouped phrases to delimiting one or more words grouped within each phrase of the initially delimited one or more grouped phrases, and
wherein the new delimiter position is set based on a confidence level determined for each variation of the new delimiter position.

18. An information processing method comprising:
receiving, by a processor, information regarding a new delimiter position different from a result of speech-to-text conversion associated with collected first utterance information;
controlling output of a new conversion result obtained by performing speech-to-text conversion based on the new delimiter position; and
outputting the new conversion result and the new delimiter position in association with each other,
wherein the new delimiter position is set based on a result obtained by comparing first sound-related information obtained from the collected first utterance information with second sound-related information obtained from collected second utterance information,
wherein the new delimiter position is set from initially delimiting one or more grouped phrases to delimiting one or more words grouped within each phrase of the initially delimited one or more grouped phrases, and
wherein the new delimiter position is set based on a confidence level determined for each variation of the new delimiter position.

* * * * *